(No Model.)
C. F. STILLMAN.
TROTTING SULKY.
No. 350,169. Patented Oct. 5, 1886.
Fig. 1.
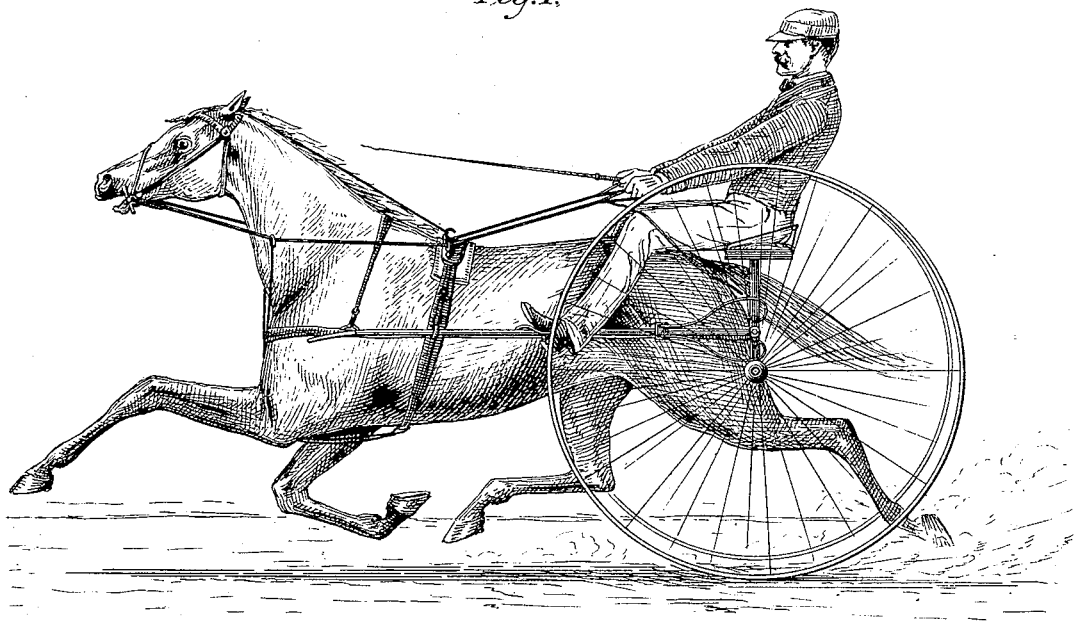
Fig. 4.
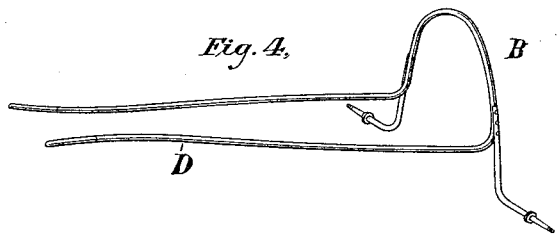
Fig. 2.
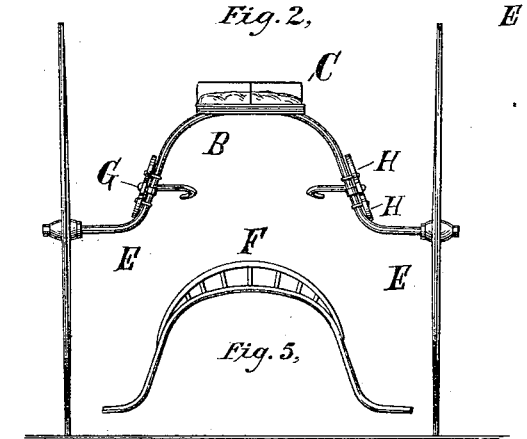
Fig. 5.
Fig. 3.
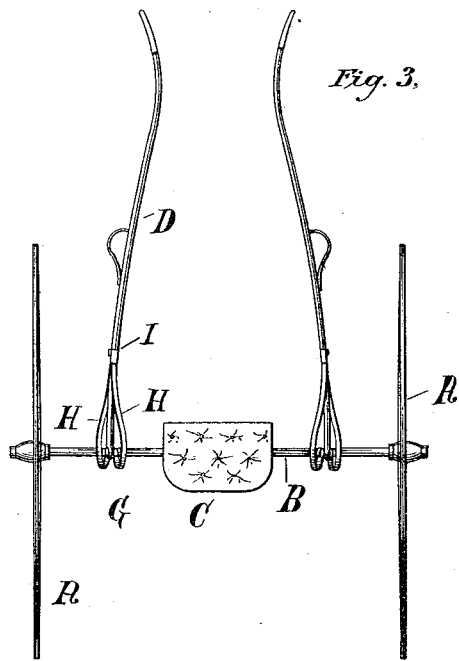
Witnesses
Geo. W. Breck.
Carrie E. Ashley
Inventor
Charles F. Stillman
By his Attorney
Geo. H. Benjamin
N. PETERS, Photo-Lithographer, Washington, D. C.

UNITED STATES PATENT OFFICE.

CHARLES F. STILLMAN, OF NEW YORK, N. Y.

TROTTING-SULKY.

SPECIFICATION forming part of Letters Patent No. 350,169, dated October 5, 1886.

Application filed January 18, 1886. Serial No. 189,016. (No model.)

*To all whom it may concern:*

Be it known that I, CHARLES F. STILLMAN, of the city, county, and State of New York, have invented a new and Improved Trotting-Sulky, of which the following is a specification.

The object of my invention is to enable the horse to be attached more closely to the vehicle than is possible in the ordinary trotting-sulky where a straight or slightly-curved axle is used.

In a previous patent granted to me on February 15, 1881, and numbered 237,924, I have shown a sulky the axle of which is curved backward around the rear of the horse and the driver's seat is supported upon braces immediately over the horse's hips; and in Patent No. 244,404, granted to me July 19, 1881, I have shown a sulky wherein the axle is curved vertically upward and over the hips of the horse, the driver's seat being upon the summit of the axle.

Practical experience has demonstrated that with axles arranged as shown in either of the above-mentioned patents the driver's seat is too high for high speed or safety. To obtain the best results the seat of the driver should be as near to the body of the horse as possible, and of such a height above the axial line of the wheels as to bring the weight of the driver as nearly in the line of motion of the horse as possible, and yet not interfere with the throw of the hind limbs of the horse in trotting. To produce the desired result, I have devised the sulky which is the subject of my present invention, and which I will now describe.

In the accompanying drawings similar letters of reference indicate like parts.

Figure 1 is a side elevation of my improved sulky, showing the horse in the act of trotting and the driver in place. Fig. 2 is a rear view. Fig. 3 is a plan view. Fig. 4 is a perspective view showing the shafts and arch of the axle made in one piece. Fig. 5 is a front view of a trussed axle.

Referring to the drawings, A A are the wheels, which are journaled upon short horizontal arms A' A' of the axle B, which is curved upward, so that the top of the axle will be approximately on a line with the top of the back of the horse in trotting.

C represents the driver's seat arranged over the center of the axle in any convenient manner. The axle B may be formed of a single piece, as shown in Fig. 2, or it may be made as shown in Fig. 3, where the arch of the axle is formed continuous with the shafts D, the short arms E, which form the journals for the wheels, being suitably attached thereto. In order to prevent any spring in the axle, and consequent buckling and spread of the wheels, the axle may be trussed as at N, Fig. 5, or provided with one or more stiffening-braces, as shown at F, Fig. 5. The shafts D are fastened on each side of the axle preferably by pivotal joints G, and attached to the axle on each side are the bent springs H H', which respectively bear upon the top and bottom surfaces of the shafts, the ends of the springs working loosely in boxes I I, rigidly attached to the shafts. The object of this arrangement is, by reason of the pivotal connection of the shafts, to allow them to follow the up-and-down motion of the animal in trotting, and the springs by their compensating action to preserve the vertical position of the axle and keep the driver's seat steady.

I wish it understood that I do not limit myself to any particular height for the arch of the axle above the axial line of the wheels, provided that the curve of the axle shall be such that when the horse is attached to the sulky, as shown in Fig. 1, the top of the curve of the axle shall be such as not to interfere with the backward throw of the hind limbs of the animal in trotting.

I am aware that sulky-axles have heretofore been made with an upward curve or arched; but I am the first, so far as I am aware, to so arch or curve the axle upward that the axial line of the wheels can be brought close to the hind limbs of the animal and yet not interfere with the backward movement of the limbs in trotting.

I claim as my invention—

1. In a trotting-sulky, the combination of an axle having short horizontal arms at its extremities to receive the wheels and arched above the plane of the shafts, and traction-shafts loosely pivoted to each side of the said axle, substantially as described.

2. The combination, in a trotting-sulky, of an axle arched above the plane of the shafts, traction-shafts loosely pivoted to said axle, and springs attached to said axle and bearing upon the upper and lower surfaces of said shafts.

3. In a trotting-sulky, an axle arched above the plane of the shafts, said axle formed continuous with the shafts, and having short horizontal arms attached thereto to receive the wheels, substantially as described.

4. The combination, in a trotting-sulky, and with the axle thereof, of traction-shafts loosely pivoted to said axle, and springs fixedly attached to said axle and bearing upon the upper and lower surfaces of said shafts.

In testimony whereof I have hereunto subscribed my name this 15th day of September, A. D. 1885.

CHARLES F. STILLMAN.

Witnesses:
FRANK D. SHAW,
J. ALEX. STITT.